(12) United States Patent
Kim et al.

(10) Patent No.: US 10,707,467 B2
(45) Date of Patent: Jul. 7, 2020

(54) SEPARATOR FOR RECHARGEABLE BATTERY AND RECHARGEABLE LITHIUM BATTERY INCLUDING THE SAME

(71) Applicant: SAMSUNG SDI CO., LTD., Yongin-si, Gyeonggi-do (KR)

(72) Inventors: Jinwoo Kim, Suwon-si (KR); Jungyoon Lee, Suwon-si (KR); Sangho Lee, Suwon-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 248 days.

(21) Appl. No.: 15/596,221

(22) Filed: May 16, 2017

(65) Prior Publication Data

US 2017/0338460 A1 Nov. 23, 2017

(30) Foreign Application Priority Data

May 17, 2016 (KR) .......................... 10-2016-0060150

(51) Int. Cl.
| | | |
|---|---|---|
| *H01M 2/16* | (2006.01) | |
| *H01M 10/0525* | (2010.01) | |
| *C08J 7/04* | (2020.01) | |
| *C09J 127/16* | (2006.01) | |
| *C09J 7/30* | (2018.01) | |
| *C09J 7/26* | (2018.01) | |
| *C08K 3/22* | (2006.01) | |

(52) U.S. Cl.
CPC ......... *H01M 2/1686* (2013.01); *C08J 7/0427* (2020.01); *C09J 7/26* (2018.01); *C09J 7/30* (2018.01); *C09J 127/16* (2013.01); *H01M 2/166* (2013.01); *H01M 2/1653* (2013.01); *C08J 2323/06* (2013.01); *C08J 2427/16* (2013.01); *C08K 3/22* (2013.01); *C08K 2003/2227* (2013.01); *C09J 2201/20* (2013.01); *C09J 2203/33* (2013.01); *C09J 2423/006* (2013.01); *C09J 2427/00* (2013.01); *H01M 10/0525* (2013.01)

(58) Field of Classification Search
CPC .. H01M 2/1686; H01M 2/1653; H01M 2/166; H01M 10/0525; C09J 7/26; C09J 7/30; C09J 127/16; C09J 2423/006; C09J 2201/20; C09J 2203/33; C09J 2427/00; C08J 7/047; C08J 2323/06; C08J 2427/16; C08K 3/22; C08K 2003/2227
See application file for complete search history.

(56) References Cited

U.S. PATENT DOCUMENTS

| | | | | |
|---|---|---|---|---|
| 2014/0030578 A1* | 1/2014 | Hoshiba | ............... | H01M 2/1653 429/144 |
| 2014/0255754 A1* | 9/2014 | Nishikawa | ............ | H01M 2/027 429/145 |
| 2015/0200395 A1* | 7/2015 | Stevanovic | ........... | B01F 3/1214 429/163 |
| 2015/0303003 A1 | 10/2015 | Ha et al. | | |
| 2016/0293999 A1* | 10/2016 | Kim | ........................ | C09J 133/08 |
| 2017/0256768 A1* | 9/2017 | Yoo | ...................... | H01M 2/1653 |
| 2019/0013504 A1* | 1/2019 | Choi | ....................... | H01M 2/16 |

FOREIGN PATENT DOCUMENTS

| | | |
|---|---|---|
| CN | 103579561 A | 2/2014 |
| EP | 1 385 228 A2 | 1/2004 |
| JP | 11-016561 A | 1/1999 |
| JP | 2013-161707 A | 8/2013 |
| JP | 2014-041818 A | 3/2014 |
| KR | 10-2014-0050877 A | 4/2014 |
| KR | 10-2014-0072104 A | 6/2014 |
| KR | 10-2014-0099715 A | 8/2014 |
| KR | 10-2014-0133587 A | 11/2014 |
| KR | 10-2015-0025825 A | 3/2015 |
| KR | 10-2015-0106810 | 9/2015 |
| KR | 10-2015-0122611 A | 11/2015 |
| WO | WO 2015/076602 A1 | 5/2015 |

OTHER PUBLICATIONS

Chinese Office Action dated Oct. 9, 2019, including the Search Report dated Sep. 25, 2019, of the corresponding Chinese Patent Application No. 201710347303.4.

* cited by examiner

*Primary Examiner* — Muhammad S Siddiquee
(74) *Attorney, Agent, or Firm* — Lee IP Law, P.C.

(57) ABSTRACT

A separator for a rechargeable battery includes a porous substrate and an adhesive layer on at least one surface thereof. The adhesive layer includes a first binder, a second binder, and a filler. The first binder includes a structural unit derived from vinylidene fluoride and a structural unit derived from hexafluoropropylene. The structural unit derived from hexafluoropropylene is included in an amount of about 10 wt % or less based on a total weight of the first binder. A weight average molecular weight of the first binder ranges from about 800,000 to about 1,500,000. The second binder includes a structural unit derived from vinylidene fluoride and a structural unit derived from hexafluoropropylene. The structural unit derived from hexafluoropropylene is included in an amount of 10 wt % or less based on a total weight of the second binder. A weight average molecular weight of the second binder is 600,000 or less.

20 Claims, 4 Drawing Sheets

SEPARATOR FOR RECHARGEABLE BATTERY AND RECHARGEABLE LITHIUM BATTERY INCLUDING THE SAME

CROSS-REFERENCE TO RELATED APPLICATION

Korean Patent Application No. 10-2016-0060150, filed on May 17, 2016, in the Korean Intellectual Property Office, and entitled: "Separator for Rechargeable Battery and Rechargeable Lithium Battery Including the Same," is incorporated by reference herein in its entirety.

BACKGROUND

1. Field

Embodiments relate to a separator for a rechargeable battery and a rechargeable lithium battery including the same.

2. Description of the Related Art

A separator for an electrochemical battery is an intermediate film that separates a positive electrode and a negative electrode in a battery, and maintains ion conductivity continuously to enable charge and discharge of a battery.

SUMMARY

Embodiments are directed to a separator for a rechargeable battery including a porous substrate and an adhesive layer on at least one surface of the porous substrate. The adhesive layer includes a first binder, a second binder, and a filler. The first binder includes a structural unit derived from vinylidene fluoride and a structural unit derived from hexafluoropropylene. The structural unit derived from hexafluoropropylene is included in an amount of less than or equal to about 10 wt % based on a total weight of the first binder, and a weight average molecular weight of the first binder ranging from about 800,000 to about 1,500,000. The second binder includes a structural unit derived from vinylidene fluoride and a structural unit derived from hexafluoropropylene. The structural unit derived from hexafluoropropylene is included in an amount of less than or equal to about 10 wt % based on a total weight of the second binder, and a weight average molecular weight of the second binder is less than or equal to about 600,000.

The first binder may further include a structural unit derived from a monomer having at least one hydroxy group.

The monomer having at least one hydroxy group may be at least one selected from (meth)acrylic acid, a derivative of (meth)acrylate having a hydroxy group, itaconic acid or a derivative thereof, maleic acid or a derivative thereof, and hydroxyalkyl allyl ether.

The structural unit derived from the monomer having at least one hydroxy group may be included in an amount of about 0.5 wt % to about 7 wt % based on the total weight of the first binder.

The first binder is included in an amount of about 10 wt % to about 50 wt % and the second binder is included in an amount of about 50 wt % to about 90 wt % based on a total amount of the first binder and the second binder.

A total amount of the first binder and the second binder may be about 50 wt % to about 70 wt % of a total weight of the adhesive layer.

The filler may be included in an amount of about 30 wt % to about 50 wt % based on a total weight of the adhesive layer.

The filler may include $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof.

The porous substrate may include a polyolefin.

According to an embodiment, a rechargeable lithium battery may include a positive electrode, a negative electrode, and the separator as described above disposed between the positive electrode and the negative electrode.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Figure 1:
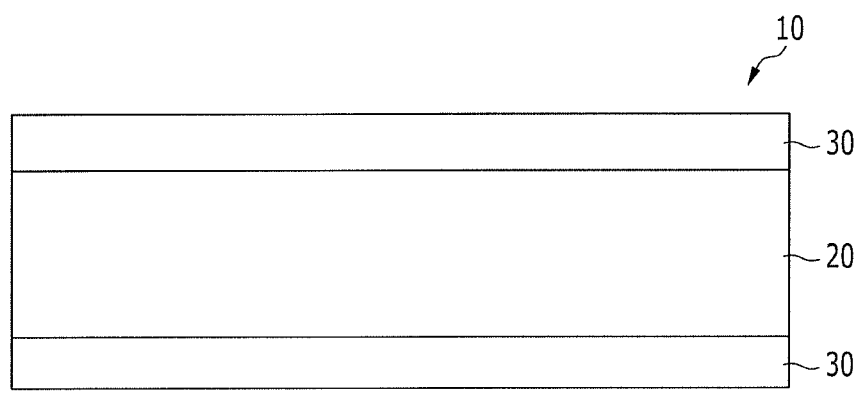
FIG. 1 illustrates a cross-sectional view showing a separator for a rechargeable battery according to an embodiment.

Hereinafter, a separator for a rechargeable battery according to an embodiment is described. FIG. 1 illustrates a view showing a separator for a rechargeable battery according to an embodiment. Referring to FIG. 1, a separator 10 for a rechargeable battery according to an embodiment may include a porous substrate 20 and an adhesive layer 30 disposed on one surface or both surfaces of the porous substrate 20.

The porous substrate 20 may have a plurality of pores and may be a general porous substrate used in an electrochemical device. Examples of the porous substrate 20 may include a polymer film formed of a polymer selected from, or a mixture of, two or more selected from a polyolefin such as polyethylene, polypropylene, or the like, a polyester such as polyethylene terephthalate, polybutylene terephthalate, or the like, a polyacetal, a polyamide, a polyimide, a polycarbonate, a polyetheretherketone, a polyaryletherketone, a polyetherimide, a polyamideimide, a polybenzimidazole, a polyether sulfone, a polyphenylene oxide, a cyclic olefin copolymer, a polyphenylene sulfide, a polyethylene naphthalate, a glass fiber, Teflon, and polytetrafluoroethylene.

The porous substrate 20 may be, for example, a polyolefin-based substrate. The polyolefin-based substrate may provide improved safety of a battery due to its improved shut-down function. The polyolefin-based substrate may be selected from, for example, a polyethylene single film, a polypropylene single film, a polyethylene/polypropylene double film, a polypropylene/polyethylene/polypropylene triple film, and a polyethylene/polypropylene/polyethylene triple film. In some implementations, the polyolefin-based substrate may be formed of a resin that includes a non-olefin resin in addition to an olefin resin or a resin that is a copolymer of olefin and a non-olefin monomer.

The porous substrate 20 may have a thickness of about 1 μm to about 40 μm, or, for example about 1 μm to about 30 μm, about 1 μm to about 20 μm, about 5 μm to about 15 μm, or about 5 μm to about 10 μm.

The adhesive layer 30 may include a binder and a filler.

The adhesive layer 30 may provide improved heat resistance by including the filler. The adhesive layer 30 may prevent abrupt shrinkage or deformation of a separator that could be caused by an increase in temperature. The filler may be, for example, an inorganic filler, an organic filler, an organic/inorganic filler, or a combination thereof. The inorganic filler may be a ceramic material that is capable of improving heat resistance. For example, the inorganic filler may be a metal oxide, a semi-metal oxide, a metal fluoride, a metal hydroxide, or a combination thereof. The inorganic filler may be, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite (AlO(OH)), or a combination thereof. The organic filler may include an acrylic compound, an imide compound, an amide compound, or a combination thereof, as examples. The organic filler may have, for example, a core-shell structure.

The filler may have a spherical shape, a sheet shape, a cubic shape, or an amorphous shape. An average particle diameter of the filler may range about 1 nm to about 2.500 nm, or, for example, about 100 nm to about 2,000 nm, about 100 nm to about 1,000 nm, or about 300 nm to about 800 nm. The term "average particle diameter of the filler" refers to a particle size ($D_{50}$) at a volume ratio of 50% in a cumulative size-distribution curve. By using the filler having an average particle diameter within the ranges, the adhesive layer 30 may have an appropriate strength. The filler may be used by mixing two or more different kinds of fillers or two or more fillers having different sizes.

The filler may be included in an amount of about 10 wt % to about 99 wt % based on the total weight of the adhesive layer 30. In some implementations, the filler may be included in an amount of, for example, about 20 wt % to about 90 wt %, about 30 wt % to about 75 wt %, about 30 wt % to about 60 wt %, or about 30 wt % to about 50 wt % based on the adhesive layer 30. When the filler is included within the ranges, the separator 10 for a rechargeable battery according to an embodiment may have improved heat resistance, durability, and stability.

The binder may play a role of fixing the filler on the porous substrate 20 and may simultaneously provide adherence in order to adhere one surface of the adhesive layer 30 to the porous substrate 20 and the other surface thereof to the electrode.

In an embodiment, the binder may include a first binder and a second binder.

The first binder may be a copolymer obtained from vinylidene fluoride and hexafluoropropylene. For example, the first binder may include a structural unit derived from vinylidene fluoride and a structural unit derived from hexafluoropropylene. A ratio of the structural unit derived from vinylidene fluoride and the structural unit derived from hexafluoropropylene may substantially be the same as a supply ratio of the vinylidene fluoride and the hexafluoropropylene.

The first binder may have various forms. For example, the first binder may be an alternating polymer in which the units are alternately distributed, a random polymer in which the units are randomly distributed, or a graft polymer in which a part of structural unit is grafted. For example, the first binder may be a linear polymer, a branched polymer, or a mixed form.

The structural unit derived from vinylidene fluoride may be included in the first binder in an amount of about 90 wt % to about 99.5 wt %, or, for example, about 93 wt % to about 99 wt %, or about 95 wt % to about 99 wt % based on total weight of the first binder. When the structural unit derived from vinylidene fluoride is included within the ranges, the first binder may ensure improved adherence and impregnation properties of an electrolyte solution.

The structural unit derived from hexafluoropropylene may be included in an amount of greater than 0 wt % and less than or equal to about 10 wt %, or, for example about 0.5 wt % to about 10 wt %, about 1 wt % to about 10 wt %, about 1 wt % to about 9 wt %, about 2 wt % to about 7 wt %, or about 4 wt % to about 6 wt % based on the total weight of the first binder. When the structural unit derived from hexafluoropropylene is included within the ranges, the first binder may ensure chemical stability while exhibiting excellent solubility for a low-boiling point solvent and may have excellent adherence. Accordingly, the adhesive layer may be formed using a low-boiling point solvent without a separate process. A decrease of air permeability that may result from the use of a high-boiling point solvent may be avoided. The low-boiling point solvent may be, for example, a solvent having a boiling point of less than or equal to about 80° C. The low-boiling point may be, for example, acetone, methylethylketone, ethylisobutylketone, tetrahydrofuran, dimethylformaldehyde, cyclohexane, or a mixed solvent thereof. For example the first binder may have solubility of less than or equal to about 20 at 40° C. for the solvent having a boiling point of less than or equal to about 80° C.

The first binder may further include a structural unit derived from a monomer having at least one hydroxy group. In this case, the first binder may exhibit improved adherence.

The structural unit derived from the monomer having at least one hydroxy group may be included in an amount of less than or equal to about 10 wt %, for example, about 0.5 wt % to about 7 wt %, about 0.5 wt % to about 5 wt %, or about 1 wt % to about 3 wt % based on the total weight of the first binder. When the structural unit derived from the monomer having at least one hydroxy group is included within the ranges, the first binder may exhibit excellent adherence, and the adhesive layer 30 including the same may exhibit improved adherence, durability, and air permeability.

When the first binder further includes the structural unit derived from the monomer having at least one hydroxy group, the structural unit derived from vinylidene fluoride may be included in an amount of about 80 wt % to about 99 wt %, the structural unit derived from hexafluoropropylene may be included in an amount of about 0.5 wt % to about 10 wt %, and the structural unit derived from the monomer having at least one hydroxy group may be included in an amount of about 0.5 wt % to about 10 wt % based on the total weight of the first binder.

The monomer having at least one hydroxy group may be, for example, a monomer having at least one hydroxy group and at least one carbon-carbon double bond. For example, the monomer having at least one hydroxy group may be a monomer having a hydroxy group and an acryl group, for example, (meth)acrylic acid, or a derivative of a (meth) acrylate having a hydroxy group. In some implementations, the monomer having at least one hydroxy group may be a monomer having two or more carboxyl groups and a carbon-carbon double bond. For example, the monomer having at least one hydroxy group may be itaconic acid or a derivative thereof, or maleic acid or a derivative thereof. As another example, the monomer having at least one hydroxy group may be a monomer having a hydroxy group and an allyl group, for example, a hydroxyalkyl allyl ether. In addition, the monomer having at least one hydroxy group may be a monomer having a phosphoric acid group and an acryl group or a monomer having a sulfuric acid group and an acryl group.

Herein, the term "(meth)acrylic acid" refers to acrylic acid or methacrylic acid. The (meth)acrylic acid may be substituted with a halogen element as is the case of, for example, trichloroacrylic acid.

The derivative of (meth)acrylate having a hydroxy group may be, for example, hydroxyalkyl (meth)acrylate, carboxyalkyl (meth)acrylate, (meth) acryloyloxy alkylsuccinic acid, (meth)acryloyloxy alkylphthalic acid, (meth)acryloyxyalkoxy hydroxybenzophenone, hydroxyphenoxyalkyl (meth)acrylate, glycerol mono(meth)acrylate, polyalkylene glycol mono(meth)acrylate, or hydroxyalkyl (meth)acrylamide.

Herein, the term "alkyl" may refer to, for example a C1 to C30 alkyl, or for example a C1 to C20 alkyl, a C1 to C10 alkyl, or a C1 to C5 alkyl. The term "alkylene" may refer to, for example, a C1 to C30 alkylene, a C1 to C20 alkylene, a C1 to C10 alkylene, or a C1 to C5 alkylene. The term "alkoxy" may refer to, for example, a C1 to C30 alkoxy, or for example, a C1 to C20 alkoxy, a C1 to C10 alkoxy, or a C1 to C5 alkoxy. The term "aryl" may refer to, for example, a C6 to C30 aryl, a C6 to C20 aryl, or a C6 to C10 aryl.

The hydroxyalkyl (meth)acrylate may be, for example, hydroxymethyl (meth)acrylate, hydroxyethyl (meth)acrylate, hydroxypropyl (meth)acrylate, hydroxybutyl (meth)acrylate, hydroxypentyl (meth)acrylate, hydroxyhexyl (meth)acrylate, or the like. Chains thereof may be substituted by a halogen atom.

The carboxyalkyl (meth)acrylate may be, for example, carboxymethyl (meth)acrylate, carboxyethyl (meth)acrylate, carboxypropyl (meth)acrylate, carboxybutyl (meth)acrylate, carboxypentyl (meth)acrylate, carboxyhexyl (meth)acrylate, or the like.

The (meth)acryloyloxy alkylsuccinic acid may be, for example, (meth)acryloyloxy methylsuccinic acid, (meth)acryloyloxy ethylsuccinic acid, (meth)acryloyloxy propylsuccinic acid, or the like. The (meth)acryloyloxy alkylphthalic acid may be, for example, (meth)acryloyloxy methylphthalic acid, (meth)acryloyloxy ethylphthalic acid, (meth)acryloyloxy propylphthalic acid, or the like.

The (meth)acryloxyalkoxy hydroxybenzophenone may be, for example, 4-(2-acryloxyethoxy)-2-hydroxybenzophenone, or the like.

The polyalkylene glycol mono(meth)acrylate may be, for example, polyethylene glycol monomethacrylate. The hydroxyalkyl (meth)acrylamide may be, for example, N-(2-hydroxypropyl)methacrylamide.

The monomer having at least one hydroxy group may be a monomer having two or more carboxyl groups, such as itaconic acid or maleic acid. In some implementations, the monomer may be a derivative thereof or anhydride thereof. The anhydride of the maleic acid derivative may be, for example, 3-methyl-2,5-furandione, 3-ethyl-2,5-furandione, 3-propyl-2,5-furandione, 3-butyl-2,5-furandione, 3-pentyl-2,5-furandione, 3-hexyl-2,5-furandione, 3-heptyl-2,5-furandione, 3-octyl-2,5-furandione, or the like.

The monomer having at least one hydroxy group may be, for example, a monomer having a hydroxy group and an allyl group, for example, a hydroxyalkyl allyl ether such as, for example, hydroxyalkane monoallyl ether, hydroxyalkane diallyl ether, or hydroxypolyalkoxy allyl ether.

As another example, the monomer having at least one hydroxy group may be a monomer having a phosphoric acid group and an acryl group. For example, the monomer having at least one hydroxy group may be monoacryloxyethyl phosphate or bis(2-methacryloxyethyl) phosphate or a monomer having a sulfuric acid group and an acryl group, such as 2-sulfoethyl methacrylate or 3-sulfopropyl methacrylate.

When the first binder further includes the structural unit derived from the monomer having at least one hydroxy group, the structural unit derived from hexafluoropropylene may be included in the same amount as, or greater amount than, the structural unit derived from the monomer having the hydroxy group. For example, the copolymer may include the structural unit derived from hexafluoropropylene and the structural unit derived from the monomer having the hydroxy group in a weight ratio of, for example about 1:1 to about 4:1, or about 2:1 to about 4:1. In this case, adherence and air permeability of the adhesive layer may be improved.

A weight average molecular weight of the first binder may range from about 800,000 to about 1,500,000, or, for example about 800,000 to about 1,300,000, or about 900,000 to about 1,200,000. When the first binder has a weight average molecular weight within the ranges, improved adherence may be shown. The weight average molecular weight may be, for example, a polystyrene-reduced average molecular weight measured by gel permeation chromatography.

A crystallinity of the first binder may be about 35% to about 45%, or, for example about 38% to about 45%, or about 40% to about 45%. In this case, the first binder may exhibit excellent adherence. The crystallinity of the first binder may be higher than a crystallinity of the second binder, which will be described below.

The first binder may be prepared by a suitable method such as emulsion polymerization, suspension polymerization, massive polymerization, solution polymerization, or bulk polymerization. For example, the first binder may be prepared by suspension polymerization.

The second binder may include a structural unit derived from vinylidene fluoride and a structural unit derived from hexafluoropropylene. The second binder may be in various forms such as an alternating polymer, a random polymer, or graft a polymer. The second binder may be a linear polymer, a branched polymer, or a mixed form, and may be a polymer having more branched chains than the first binder.

The structural unit derived from vinylidene fluoride may be included in an amount of about 90 wt % to about 99.5 wt %, or, for example about 93 wt % to about 99 wt %, or about 95 wt % to about 99 wt % based on the total weight of the second binder. When the structural unit derived from vinylidene fluoride is included within the ranges, the second binder may ensure excellent adherence and impregnation properties of an electrolyte solution.

The structural unit derived from hexafluoropropylene may be included in an amount of greater than 0 wt % and less than or equal to about 10 wt %, or, for example about 0.5 wt % to about 10 wt %, about 1 wt % to about 9 wt %, about 2 wt % to about 8 wt %, about 3 wt % to about 7 wt %, or about 4 wt % to about 6 wt % based on the total weight of the second binder. When the structural unit derived from hexafluoropropylene is included within the ranges, the second binder may ensure chemical stability while exhibiting excellent solubility for a low-boiling point solvent and may have excellent adherence. Accordingly, without a separate process, the adhesive layer 30 may be formed using a low-boiling point solvent. A decrease of air permeability that may occur when a high-boiling point solvent is used may be avoided.

A weight average molecular weight of the second binder may be less than or equal to about 600,000, and, for example greater than or equal to about 500, greater than or equal to about 1,000, greater than or equal to about 10,000, or greater than or equal to about 100,000, and less than or equal to about 550,000 or less than or equal to about 500,000. The weight average molecular weight of the second binder may be, for example, greater than or equal to about 100,000 and less than about 600,000, or greater than or equal to about 200,000 and less than about 600,000, or about 300,000 to about 500,000, or about 350,000 to about 500,000. When the second binder has a weight average molecular weight within the ranges, the adhesive layer 30 including the same may exhibit improved wet adherence and dry adherence. The term "weight average molecular weight" may refer to a polystyrene-reduced average molecular weight measured by gel permeation chromatography.

A crystallinity of the second binder may be about 35% to about 45%, or, for example about 35% to about 40%, or about 35% to about 37%. When the second binder has a crystallinity within the ranges, the adhesive layer 30 including the same may exhibit excellent dry adherence. The crystallinity of the second binder may be lower than the crystallinity of the first binder.

The second binder may be prepared by a suitable method such as emulsion polymerization, suspension polymerization, massive polymerization, solution polymerization, or bulk polymerization. For example, the second binder may be prepared by suspension polymerization.

The separator 10 for a rechargeable battery according to an embodiment may exhibit improved heat resistance, stability, wet adherence, and dry adherence by including the adhesive layer 30 including the filler, the first binder, and the second binder.

The first binder may be included in the adhesive layer 30 in an amount of, for example, about 10 wt % to about 50 wt %, or, for example, about 10 wt % to about 40 wt %, about 20 wt % to about 50 wt %, or about 20 wt % to about 40 wt % based on a total amount of the first binder and the second binder. The second binder may be included in the adhesive layer 30 in an amount of about 50 wt % to about 90 wt %, or, for example about 50 wt % to about 80 wt %, about 60 wt % to about 90 wt %, or about 60 wt % to about 80 wt % based on a total amount of the first binder and the second binder. When the first binder and the second binder are included within the ranges, the separator 10 for a rechargeable battery may simultaneously improve wet adherence and dry adherence.

In the adhesive layer 30, a total amount of the first binder and the second binder may be about 50 wt % to about 70 wt %, or, for example about 55 wt % to about 70 wt %, about 50 wt % to about 65 wt %, or about 55 wt % to about 65 wt % based on a total weight of the adhesive layer 30. In the adhesive layer 30, an amount of the filler may be about 30 wt % to about 50 wt %, or for example, about 35 wt % to about 50 wt %, about 30 wt % to about 45 wt %, or about 35 wt % to about 45 wt % of the total weight of the adhesive layer 30. When the first binder, the second binder, and the filler are included in the adhesive layer 30 within the ranges, the separator 10 for a rechargeable battery including the same may have improved heat resistance, durability, wet adherence, and dry adherence.

The adhesive layer 30 may further include one or more kinds of binders in addition to the first binder and the second binder and may further include, for example, a cross-linkable binder having a cross-linking structure. The cross-linkable binder may be obtained from a monomer, an oligomer, and/or a polymer having a curable functional group capable of reacting with heat and/or light. For example, the cross-linkable binder may be obtained from a multi-functional monomer, a multi-functional oligomer, and/or a multi-functional polymer having at least two curable functional groups. The curable functional group may include a vinyl group, a (meth)acrylate group, an epoxy group, an oxetane group, an ether group, a cyanate group, an isocyanate group, a hydroxy group, a carboxyl group, a thiol group, an amino group, an alkoxy group, or a combination thereof, as examples.

The cross-linkable binder may be obtained from a monomer, an oligomer and/or a polymer including at least two (meth)acrylate groups. For example, the cross-linkable binder may be obtained from ethylene glycol di(meth)acrylate, propylene glycol di(meth)acrylate, polyethylene glycol di(meth)acrylate, polypropylene glycol di(meth)acrylate, butanediol di(meth)acrylate, hexamethylene glycol di(meth)acrylate, trimethylolpropane tri(meth)acrylate, glycerine tri(meth)acrylate, pentaerythritol tetra(meth)acrylate, diglycerine hexa(meth)acrylate, or a combination thereof.

For example, the cross-linkable binder may be obtained from a monomer, an oligomer and/or a polymer including at least two epoxy groups. For example, the cross-linkable binder may be obtained from bisphenol A diglycidyl ether, bisphenol F diglycidyl ether, hexahydrophthalic acid glycidyl ester, or a combination thereof.

For example, the cross-linkable binder may be obtained from a monomer, an oligomer and/or a polymer including at least two isocyanate groups. For example, the cross-linkable binder may be obtained from diphenylmethane diisocyanate, 1,6-hexamethylene diisocyanate, 2,2,4(2,2,4)-trimethyl hexamethylene diisocyanate, phenylene diisocyanate, 4,4'-dicyclohexylmethane diisocyanate, 3,3'-dimethyldiphenyl-4,4'-diisocyanate, xylene diisocyanate, naphthalene diisocyanate, 1,4-cyclohexyl diisocyanate, or a combination thereof.

The adhesive layer 30 may further include a non-cross-linkable binder. The non-cross-linkable binder may be for example a vinylidene fluoride-based polymer, polymethylmethacrylate, polyacrylonitrile, polyvinylpyrrolidone, polyvinylacetate, a polyethylene-vinylacetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, an acrylonitrile-styrene-butadiene copolymer, or a combination thereof.

The vinylidene fluoride-based polymer may be, for example, a homopolymer including only vinylidene fluoride monomer-derived unit or a copolymer of a vinylidene fluoride-derived unit and another monomer-derived unit. The copolymer may include, for example, a vinylidene fluoride-derived unit and at least one unit derived from chlorotrifluoroethylene, trifluoroethylene, hexafluoropropylene, ethylene tetrafluoride and ethylene monomers. For example, the copolymer may be a polyvinylidene fluoride-hexafluoropropylene (PVdF-HFP) copolymer including a vinylidene fluoride monomer-derived unit and a hexafluoropropylene monomer-derived unit.

For example, the non-cross-linkable binder may be a polyvinylidene fluoride (PVdF) homopolymer, a polyvinylidene fluoride-hexafluoropropylene (PVdF-HFP) copolymer, or a combination thereof. In this case, adherence between the porous substrate 20 and the adhesive layer 30 may be increased, stability of the separator 10 and impregnation properties of an electrolyte solution may be improved, and thus, high-rate charge and discharge characteristics of a battery may be improved.

The adhesive layer 30 may have a thickness of about 0.01 μm to 20 μm, or for example about 1 μm to about 10 μm, or about 1 μm to about 5 μm.

The separator 10 for a rechargeable battery may be manufactured by a suitable method. For example, the separator 10 for a rechargeable battery may be formed by coating a composition for forming an adhesive layer onto one surface or both surfaces of the porous substrate 20 and drying the same. The composition for forming the adhesive layer may include the first binder, the second binder, the filler, and a solvent.

The solvent may be a suitable solvent that dissolves or disperses the first binder, the second binder and/or the filler. The solvent may be for example a low-boiling point solvent having a boiling point of less than or equal to about 80° C. For example, the solvent may be acetone, methylethylketone, ethylisobutylketone, tetrahydrofuran, dimethylformaldehyde, cyclohexane, or a mixed solvent thereof.

The coating may be performed by, for example, spin coating, dip coating, bar coating, die coating, slit coating, roll coating, inkjet printing, or the like.

The drying may be performed through, for example, natural drying, drying with warm air, hot air, or low humid air, vacuum-drying, or radiation of a far-infrared ray, an electron beam, or the like. The drying may be performed at, for example, a temperature of about 25° C. to about 120° C.

When the adhesive layer 30 further includes the cross-linkable binder, the separator 10 for a rechargeable battery may be manufactured by, for example, coating a composition for an adhesive layer including the cross-linked cross-linkable binder on at least one surface of the porous substrate 20 and drying the coating composition. In some implementations, the separator 10 may be manufactured by coating a composition for an adhesive layer including a cross-linking compound, for example, a precursor of a cross-linkable binder, on at least one surface of the porous substrate 20 and curing the coated composition.

The separator 10 for a rechargeable battery may be manufactured by lamination, coextrusion, or the like in addition to or instead of the methods described above.

Hereinafter, a rechargeable lithium battery including the separator for a rechargeable battery is described.

A rechargeable lithium battery may be classified as a lithium ion battery, a lithium ion polymer battery, and a lithium polymer battery depending on kinds of a separator and an electrolyte. The rechargeable lithium battery may also be classified as cylindrical, prismatic, coin-type, pouch-type, or the like depending on shape. In addition, the rechargeable lithium battery may be a bulk type or a thin film type, depending on sizes. Structures and manufacturing methods for lithium ion batteries pertaining to this disclosure are well known in the art.

Figure 2:
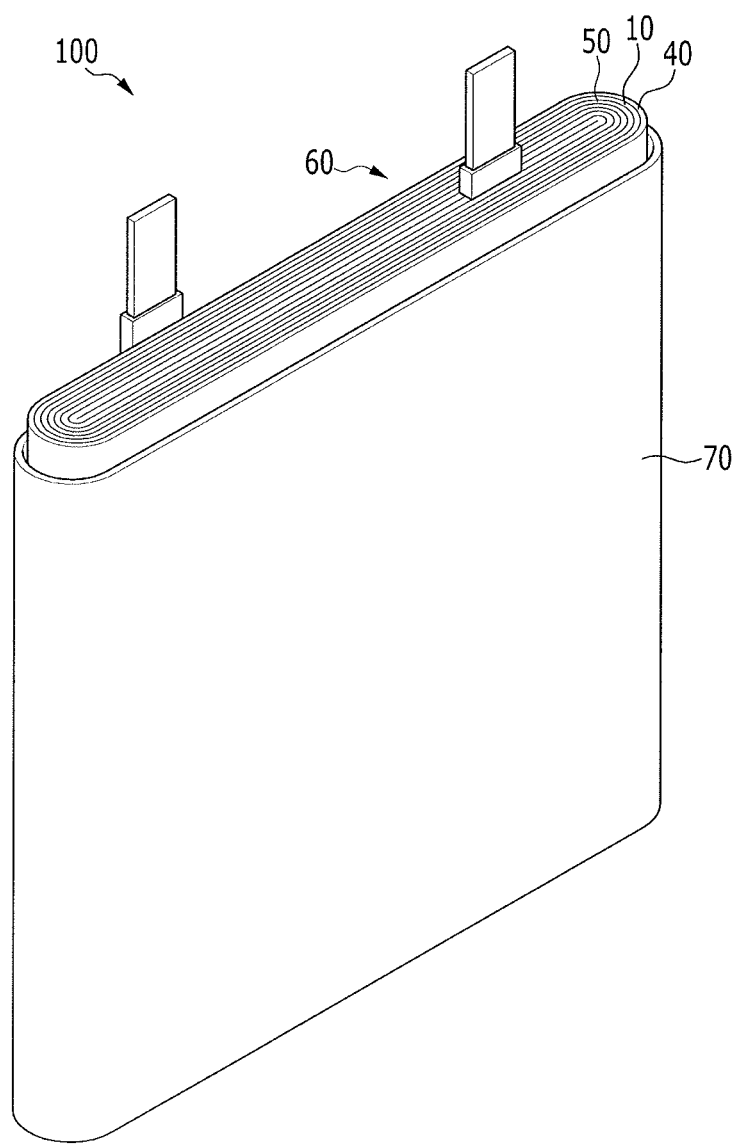
FIG. 2 illustrates an exploded perspective view showing a rechargeable lithium battery according to an embodiment.

Herein, as an example of a rechargeable lithium battery, a prismatic rechargeable lithium battery is described. FIG. 2 illustrates an exploded perspective view showing a rechargeable lithium battery according to an embodiment. Referring to FIG. 2, a rechargeable lithium battery 100 according to an embodiment may include an electrode assembly 60 manufactured by interposing a separator 10 between a positive electrode 40 and a negative electrode 50 and winding the separator 10, positive electrode 40 and negative electrode 50, and a case 70 housing the electrode assembly 60.

The electrode assembly 60 may have, for example, a jelly-roll shape formed by winding the positive electrode 40, the negative electrode 50, and the separator 10 disposed therebetween.

The positive electrode 40, the negative electrode 50, and the separator 10 may be impregnated in an electrolyte solution. The rechargeable lithium battery 100 may include a cap plate or cover to seal the electrode assembly 60 and the electrolyte solution inside the case 70.

The positive electrode 40 may include a positive current collector and a positive active material layer formed on the positive current collector. The positive active material layer may include a positive active material, a binder, and optionally a conductive material.

The positive current collector may include aluminum, nickel, or the like, as examples.

The positive active material may include a compound that is capable of intercalating and deintercalating lithium. For example, at least one of a composite oxide or a composite phosphate of a metal selected from cobalt, manganese, nickel, aluminum, iron, or a combination thereof and lithium may be used. The positive active material may be, for example, a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

The binder may provide binding properties of positive active material particles with one another and with a current collector. Examples may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like. These may be used alone or as a mixture of two or more.

The conductive material may improve the conductivity of an electrode. Examples thereof may include natural graphite, artificial graphite, carbon black, a carbon fiber, a metal powder, a metal fiber, or the like, which may be used alone or as a mixture of two or more. The metal powder and the metal fiber may include a metal of copper, nickel, aluminum, silver, and the like.

The negative electrode 50 may include a negative current collector and a negative active material layer formed on the negative current collector.

The negative current collector may include copper, gold, nickel, a copper alloy, and the like, as examples.

The negative active material layer may include a negative active material, a binder, and optionally, a conductive material. The negative active material may be a material that reversibly intercalates/deintercalates lithium ions, a lithium metal, a lithium metal alloy, a material being capable of doping and dedoping lithium, a transition metal oxide, or a combination thereof.

The material that reversibly intercalates/deintercalates lithium ions may be a carbon material generally-used as a carbon-based negative active material. Examples thereof may include crystalline carbon, amorphous carbon, or a combination thereof. Examples of the crystalline carbon may include graphite, such as amorphous, sheet-shape, flake, spherical shape or fiber-shaped natural graphite or artificial graphite. Examples of the amorphous carbon may include soft carbon or hard carbon, a mesophase pitch carbonized product, fired coke, or the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ (0<x<2), a Si—C composite, a Si—Y' alloy, Sn, $SnO_2$, a Sn—C composite, a Sn—Y' alloy, or the like, and at least one of these may be mixed with $SiO_2$. Examples of the element Y' may be selected from Mg, Ca, Sr, Ba, Ra, Sc. Y Ti, Zr, Hf Rf, V, Nb, Ta, Db, Cr, Mo, W, Sg, Tc, Re, Bh, Fe, Pb, Ru, Os, Hs, Rh, Jr, Pd, Pt, Cu, Ag, Au, Zn, Cd, B, Al, Ga, Sn, In, Tl, Ge, P, As, Sb, Bi, S, Se, Te, Po, and a combination thereof. (In the Sn—Y' alloy, Y' is not Sn. In the Si—Y' alloy, Y' is not Si.) The transition metal oxide may be vanadium oxide, lithium vanadium oxide, and the like.

The binder and the conductive material used in the negative electrode 50 may be the same as the binder and conductive material of the positive electrode.

The positive electrode 40 and the negative electrode 50 may be manufactured by mixing each active material composition including each active material and a binder, and optionally a conductive material in a solvent, and coating the active material composition onto each current collector. The solvent may be N-methylpyrrolidone, or the like, as an example. The electrode manufacturing method may be a well known method.

The electrolyte solution may include an organic solvent a lithium salt.

The organic solvent may serve as a medium for transmitting ions taking part in the electrochemical reaction of a battery. Examples thereof may be selected from a carbonate-based solvent, an ester-based solvent, an ether-based solvent, a ketone-based solvent, an alcohol-based solvent, and an aprotic solvent. The carbonate-based solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, or the like. The ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, or the like. The ether-based solvent may be dibutyl ether, tetraglyme, diglyme, dimethoxyethane, 2-methyltetrahydrofuran, tetrahydrofuran, or the like. The ketone-based solvent may be cyclohexanone, or the like. The alcohol-based solvent may be ethanol, isopropyl alcohol, or the like. The aprotic solvent may be a nitrile such as R—CN (where R is a C2 to C20 linear or branched or cyclic hydrocarbon group, a double bond, an aromatic ring, or an ether bond), or the like, an amides such as dimethyl formamide, a dioxolane such as 1,3-dioxolane, a sulfolane, or the like.

The organic solvent may be used alone or in a mixture of two or more, and when the organic solvent is used in a mixture of two or more, the mixture ratio may be controlled in accordance with a desirable cell performance.

The lithium salt may be dissolved in an organic solvent. The lithium salt may supply lithium ions in a battery, basically operate the rechargeable lithium battery, and improve lithium ion transportation between positive and negative electrodes therein. Examples of the lithium salt may include $LiPF_6$, $LiBF_4$, $LiSbF_6$, $LiAsF_6$, $LiN(SO_3jC_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, or a combination thereof.

The lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example and Comparative Example: Manufacture of Separator and Electrode Assembly Example 1

(1) Manufacture of Separator

A binder was prepared by mixing a first binder (prepared by suspension-polymerizing 93.5 wt % of vinylidene fluoride, 5 wt % of hexafluoropropylene, and 1.5 wt % of acrylic acid, and having a weight average molecular weight of 1,120,000) and a second binder (prepared by emulsion-polymerizing 95 wt % of vinylidene fluoride and 5 wt % of hexafluoropropylene, and having a weight average molecular weight of 450,000) in a weight ratio (first binder:second binder) of 3:7 in an acetone solvent.

The binder was mixed with an alumina filler (ASES-11, SUMITOMO Corp.) in a weight ratio (binder:filler) of 6:4 in an acetone solvent to prepare a composition for an adhesive layer.

The composition for an adhesive layer was dip-coated to be respectively 1.5 μm thick (3 μm thick in total) on both surfaces of a 12 μm-thick polyethylene substrate and dried at 60° C. for several seconds to manufacture a separator for a rechargeable battery.

(2) Manufacture of Electrode Assembly $LiCoO_2$, polyvinylidene fluoride, and carbon black in a weight ratio of 96:2:2 were added to N-methylpyrrolidone solvent to prepare a slurry. The slurry was coated onto an aluminum thin film and then, dried and compressed to manufacture a positive electrode.

Graphite, polyvinylidene fluoride, and carbon black in a weight ratio of 98:1:1 were added to an N-methylpyrrolidone solvent to prepare a slurry. The slurry was coated onto a copper foil and then, dried and compressed to manufacture a negative electrode.

The separator was disposed between the positive and negative electrodes and wound therewith to manufacture a jelly-roll type electrode assembly.

Comparative Example 1

A separator for a rechargeable battery and an electrode assembly were manufactured according to the same method as Example 1 except for using only the first binder but not the second binder in the separator.

Comparative Example 2

A separator for a rechargeable battery and an electrode assembly were manufactured according to the same method as Example 1 except for using not the first binder but only the second binder in the separator.

Comparative Example 3

A separator for a rechargeable battery and an electrode assembly were manufactured according to the same method as Example 1 except for using no first and second binders but instead, using a third polyvinylidene fluoride-based binder (KF 9300, Kureha Inc.) prepared through suspension/polymerization and having a weight average molecular weight of 1,000,000.

The compositions for an adhesive layer respectively applied to the separators according to Example 1 and Comparative Examples 1 to 3 are shown in Table 1.

Evaluation Example 1: Dry Adherence

The jelly-roll electrode assemblies according to Example 1 and Comparative Examples 1 to 3 were pressed at 85° C. with a pressure of 3 kgf/cm² for 4 seconds by using a 3 point-bending machine (for example, a UTM) to measure flexural strength. The results are shown in Table 1.

TABLE 1

|  | First binder | Second binder | Third binder | Binder | Filler | Flexural strength (gf/mm) |
| --- | --- | --- | --- | --- | --- | --- |
| Example 1 | 30 | 70 | — | 60 | 40 | 600 |
| Comparative Example 1 | 100 | — | — | 60 | 40 | 50 |
| Comparative Example 2 | — | 100 | — | 60 | 40 | — |
| Comparative Example 3 | — | 0 | 100 | 100 | — | 400 |

In Table 1, each amount of first, second, and third binders is given as a weight percentage (wt %) based on the entire weight of a binder, and each weight percentage of the binder and a filler is given based on the total weight of the binder and a filler.

As for the separator manufactured by using only the second binder but not the first binder according to Comparative Example 2, adherence of the adhesive layer to the polyethylene substrate was not secured. The adhesive layer was detached from the substrate, which led to a failure in manufacturing an electrode assembly.

In Table 1, referring the flexural strength evaluation results of the electrode assemblies before injecting an electrolyte solution, Example 1 showed much higher flexural strength as compared with Comparative Example 1, in which only the first binder was used, and a higher flexural strength than Comparative Example 3 in which a binder but not a filler was used in an adhesive layer. The separator in the electrode assembly of Example 1 showed remarkably excellent dry adherence.

Preparation Example 1 and Comparative Preparation Examples 1 to 3: Manufacture of Rechargeable Lithium Battery Cell The jelly-roll electrode assemblies according to Example 1 and Comparative Examples 1 to 3 were fixed in battery cases and electrolyte solutions were injected followed by sealing the resultant to manufacture rechargeable lithium battery cells.

The electrolyte solution included 1.15 M LiPF$_6$ dissolved in a mixed solvent of ethylene carbonate, ethylmethyl carbonate, and diethyl carbonate in a volume ratio of 3:5:2.

Evaluation Example 2: Evaluation of Cycle-Life Characteristics

Figure 3:
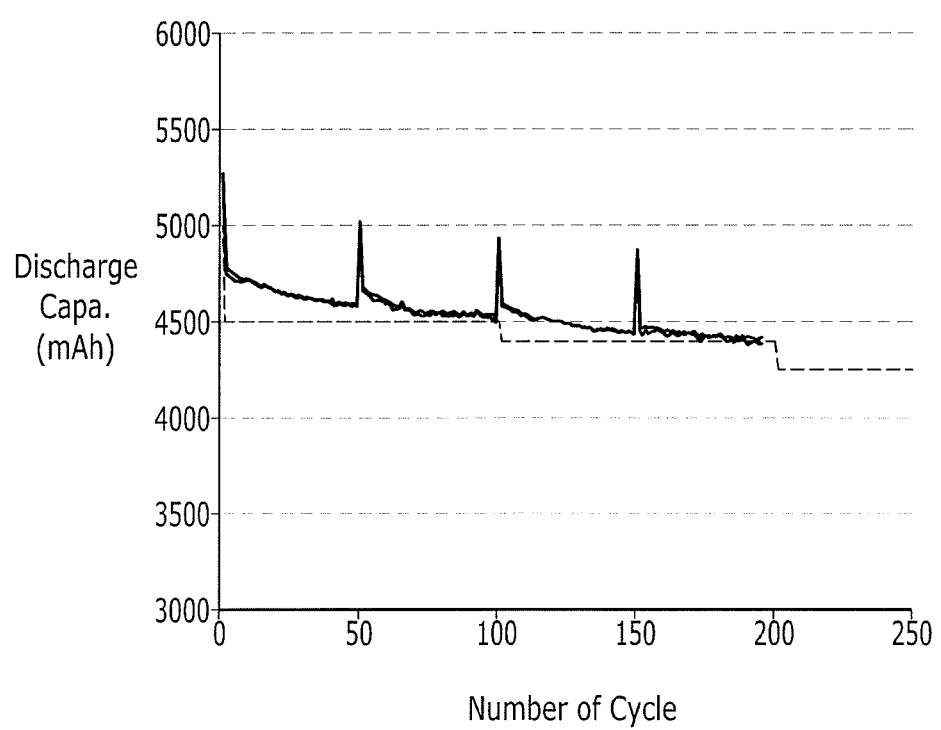
FIG. 3 illustrates a graph showing cycle-life characteristics of the rechargeable lithium battery cell of Preparation Example 1.

Cycle-life characteristics of a rechargeable lithium battery cell manufactured by applying the electrode assembly of Example 1 according to Preparation Example 1 were evaluated in the following various methods, and the results are shown in FIG. 3.

(1) Step 1: 1 cycle of 0.2 C/4.35 V/0.02 C cut-off charge, a 10 minute pause, 0.2 C/2.75 V cut-off discharge, and a 10 minute pause (2) Step 2: 49 cycles of 0.7 C/4.35 V/0.1 C cut-off charge, a 10 minute pause, 1.0 C/3.0V cut-off discharge, and 10 minute pause (3) Repeat Steps 1 and 2 for a total of 500 cycles Referring to FIG. 3, the rechargeable lithium battery cell according to Preparation Example 1 showed excellent cycle-life characteristics.

Evaluation Example 3: Evaluation of Rate Capability

Figure 4:
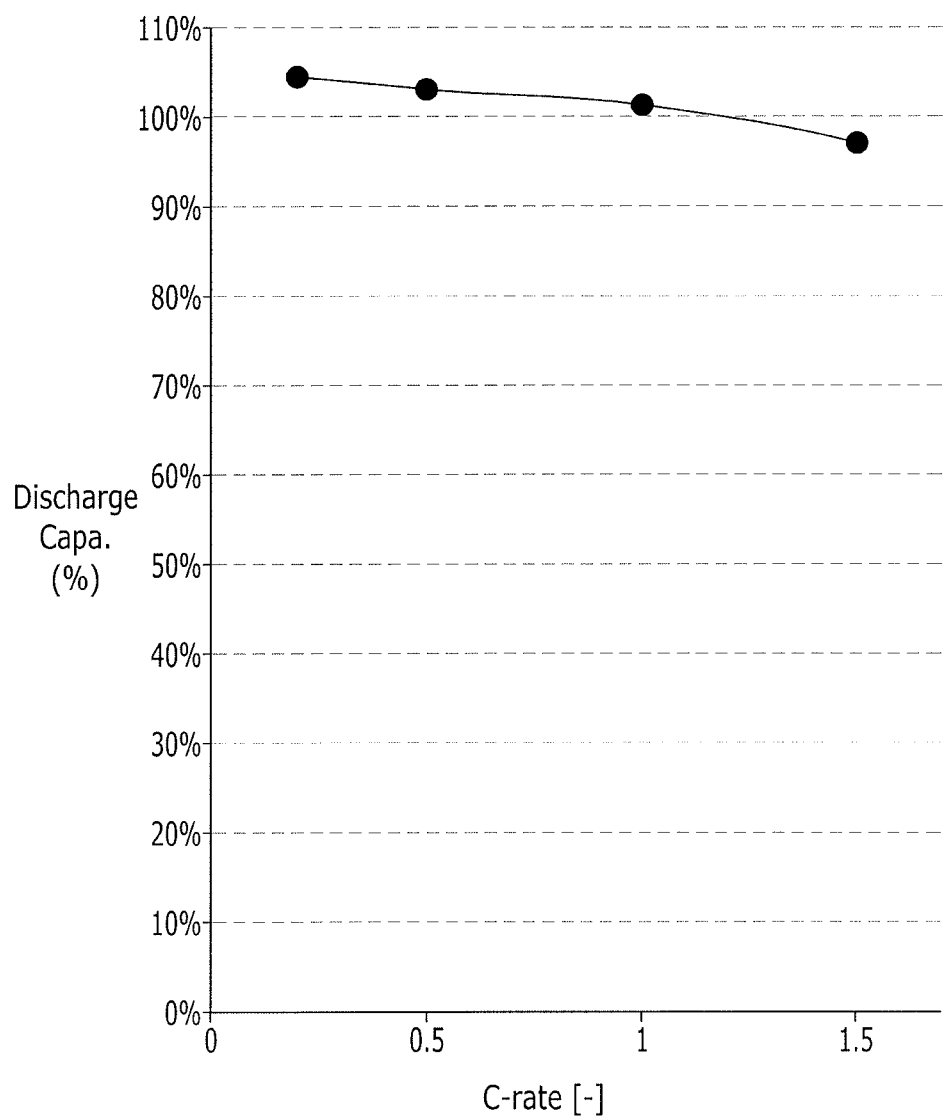
FIG. 4 illustrates a graph showing rate capability of the rechargeable lithium battery cell according to Preparation Example 1.

Discharge efficiency of the rechargeable lithium battery cell according to Preparation Example 1 depending on a C-rate was evaluated, and the results are shown in FIG. 4. Referring to FIG. 4, the rechargeable lithium battery cell according to Preparation Example 1 showed excellent rate capability.

Evaluation Example 4: Evaluation of Safety

Safety of the rechargeable lithium battery cell according to Preparation Example 1 was evaluated, and the result is shown in Table 2.

TABLE 2

|  |  | Condition | Safety evaluation |
| --- | --- | --- | --- |
| Items of safety | External short-circuit at a high temperature | 55° C. ± 5° C., 50 mΩ or less, 6 hours | OK |
|  | Overcharge | 3 C, 4.6 V, 7 hours charge | OK |
|  | Impact | 9.1 kg load with 15.8Φ, 610 ± 25 mm | OK |
|  | Crush | 13KN | OK |
|  | heating | heating at a rate of 5° C./min up to 130° C. and keeping for 1 hour | OK |

Referring to Table 2, the rechargeable lithium battery cell according to Preparation Example 1 showed sufficient results in all the safety evaluation items.

By way of summation and review, a separator for a battery may include an adhesive layer capable of adhering the positive and negative electrodes. Suitable adherence, heat resistance, durability, and the like are desirable qualities of the adhesive layer. General technology may provide improvements of wet adherence when an electrolyte solution is added to a battery. However, dry adherence may be desirable for large-sized battery when an electrolyte solution is not added to the battery. Accordingly, development of a separator having excellent dry adherence as well as excellent wet adherence and heat resistance is desirable.

Embodiments provide a separator for a rechargeable battery having improved heat resistance, wet adherence, and dry adherence is provided and a rechargeable lithium battery having improved heat resistance, durability, cycle-life characteristics, and safety.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A separator for a rechargeable battery, the separator comprising:
   a porous substrate and an adhesive layer on at least one surface of the porous substrate, wherein:
   the adhesive layer includes a first binder, a second binder, and a filler,
   the first binder includes a structural unit derived from vinylidene fluoride, a structural unit derived from a monomer having at least one hydroxy group, and a structural unit derived from hexafluoropropylene, the structural unit derived from hexafluoropropylene being included in an amount in a range of 5% or greater to less than or equal to about 10 wt % based on a total weight of the first binder, and a weight average molecular weight of the first binder ranging from about 800,000 to about 1,500,000, and
   the second binder includes a structural unit derived from vinylidene fluoride and a structural unit derived from hexafluoropropylene, the structural unit derived from hexafluoropropylene being included in an amount in a range that is 5% or greater and less than 10 wt % based on a total weight of the second binder, and a weight average molecular weight of the second binder being less than 500.000.

2. The separator as claimed in claim 1, wherein the monomer having at least one hydroxy group is at least one selected from (meth)acrylic acid, a derivative of (meth)acrylate having a hydroxy group, itaconic acid or a derivative thereof, maleic acid or a derivative thereof, and hydroxyalkyl allyl ether.

3. The separator as claimed in claim 1, wherein the structural unit derived from the monomer having at least one hydroxy group is included in an amount of about 0.5 wt % to about 7 wt % based on the total weight of the first binder.

4. The separator as claimed in claim 1, wherein the first binder is included in an amount of about 10 wt % to about 50 wt % and the second binder is included in an amount of about 50 wt % to about 90 wt % based on a total amount of the first binder and the second binder.

5. The separator as claimed in claim 1, wherein a total amount of the first binder and the second binder is about 50 wt % to about 70 wt % of a total weight of the adhesive layer.

6. The separator as claimed in claim 1, wherein the filler is included in an amount of about 30 wt % to about 50 wt % based on a total weight of the adhesive layer.

7. The separator as claimed in claim 1, wherein the filler includes $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof.

8. The separator as claimed in claim 1, wherein the porous substrate includes a polyolefin.

9. A rechargeable lithium battery comprising a positive electrode, a negative electrode, and the separator as claimed in claim 1 between the positive electrode and the negative electrode.

10. A rechargeable lithium battery comprising a positive electrode, a negative electrode, and the separator as claimed in claim 2 between the positive electrode and the negative electrode.

11. A rechargeable lithium battery comprising a positive electrode, a negative electrode, and the separator as claimed in claim 3 between the positive electrode and the negative electrode.

12. A rechargeable lithium battery comprising a positive electrode, a negative electrode, and the separator as claimed in claim 4 between the positive electrode and the negative electrode.

13. A rechargeable lithium battery comprising a positive electrode, a negative electrode, and the separator as claimed in claim 5 between the positive electrode and the negative electrode.

14. A rechargeable lithium battery comprising a positive electrode, a negative electrode, and the separator as claimed in claim 6 between the positive electrode and the negative electrode.

15. A rechargeable lithium battery comprising a positive electrode, a negative electrode, and the separator as claimed in claim 7 between the positive electrode and the negative electrode.

16. A rechargeable lithium battery comprising a positive electrode, a negative electrode, and the separator as claimed in claim 8 between the positive electrode and the negative electrode.

17. The separator as claimed in claim 1, wherein an amount of the first binder in the adhesive layer is less than amount of the second binder included in the adhesive layer.

18. The separator as claimed in claim 17, wherein the first binder is included in an amount of 10 wt % to 30 wt % and the second binder is included in an amount of 70 wt % to 90 wt % based on a total weight of the first binder and the second binder.

19. The separator as claimed in claim 1, wherein the structural unit derived from hexafluoropropylene is included in an amount of 1 wt % to 6 wt %, based on a total weight of the second binder.

20. The separator as claimed in claim 1, wherein the weight average molecular weight of the second binder is 450,000 or less.

* * * * *